United States Patent [19]
Krouth et al.

[11] Patent Number: 5,956,883
[45] Date of Patent: Sep. 28, 1999

[54] FISHING ROD HOLDER

[76] Inventors: Carl W Krouth, 243 De Leer ST., Green Bay, Wis. 54302; Gary H Krouth, 906 Shea Ave., Green Bay, Wis. 54303

[21] Appl. No.: 08/868,514

[22] Filed: Jun. 4, 1997

[51] Int. Cl.⁶ ........................................... A01K 97/00
[52] U.S. Cl. ................................. 43/21.2; 224/922
[58] Field of Search ................... 43/21.1, 21.2; 224/200, 222, 901.4, 922

[56] References Cited

U.S. PATENT DOCUMENTS

| | | | |
|---|---|---|---|
| D. 335,031 | 4/1993 | Resnik et al. ........................ D3/104 |
| 1,174,319 | 3/1916 | Hipwood ........................... 224/922 X |
| 1,583,181 | 5/1926 | Rubio ................................. 224/267 |
| 2,075,779 | 3/1937 | Johnson . | |
| 2,271,136 | 1/1942 | Geiger .................................. 224/200 |
| 2,298,694 | 10/1942 | Haislip . | |
| 2,969,899 | 1/1961 | Brooks . | |
| 4,587,757 | 5/1986 | Lirette ............................. 224/922 X |
| 4,802,612 | 2/1989 | Anderson ......................... 224/200 X |
| 5,511,336 | 4/1996 | Bishop ............................. 224/922 X |
| 5,520,312 | 5/1996 | Maddox . | |

*Primary Examiner*—David A. Scherbel
*Assistant Examiner*—Anthony Ojini
*Attorney, Agent, or Firm*—Jeffrey S. Sokol; Sokol Law Office

[57] ABSTRACT

A detachable fishing rod and reel holder, for use by a fisherman in a sitting position is disclosed. The holder comprises a concave, convex frame attached to the fisherman's leg with the concave surface bearing against the fisherman's shin whereby the force applied to the line from a fish strike is transmitted to the users leg thereby alerting him to the fish strike. The hook may be set by the simple movement of the fisherman's leg, by rotating the leg about the hip joint, or the knee joint as a pivot point.

17 Claims, 7 Drawing Sheets

FISHING ROD HOLDER

BACKGROUND OF THE INVENTION

The present invention generally relates to apparatus for holding a fishing rod and reel and more specifically holding the rod and reel by attaching the holding apparatus to the leg of the fisherman.

Many times a mechanical fishing rod holder is desired to enable a fisherman to use the fishing rod and reel, "hands-off," while sitting in an unstable boat, such as a canoe. Rod and reel holders, that mount on the side of the boat, require a fisherman to change position when tending the rod and reel. Such a change of position, of the fisherman moves, the fisherman's center of gravity thereby rocking the boat or canoe. Thus a fishing rod and reel holder mounted on the side of the boat, is difficult to tend. Further, a fishing rod and reel holder mounted on the side of the boat requires a fisherman to visually watch a bobber, or the rod tip, to determine if a fish has taken the bait or is otherwise on the line. The quick response required to set a hook, or to jig a line, is not possible with a boat mounted rod and reel holder as the fisherman must first remove the rod and reel from the holding device prior to setting the hook when the bait is taken by the fish.

DESCRIPTION OF THE RELATED ART

The discovered prior art typically includes fishing rod and reel holding devices affixed to the boat structure, or that are mounted upon the waist area of the human body to particularly assist disabled fisherman.

The following prior art patents have been discovered as a result of a prior art search:

U.S. Pat. No. 5,520,312, by Gilbert O. Maddox, "Handicapped Fisherman's Pole and Line Retriever" for fishing rod holder attached to the fisherman's shoulder.

U.S. Pat. No. 2,298,694, by A. S. Haislip, "Fishing Pole Holder and Harness Therefor" for a fishing rod holder attached to the fisherman's waist and foot.

U.S. Pat. No. 2,969,899, by R. H. Brooks, "Holding Device for Fishing Rods" for a fishing rod holder attached to the fisherman's waist and foreleg.

U.S. Pat. No. 1,583,181, by S. Rubio, "Fulcrum Device for Earth Working Implements" for a earth working implement attached to a workman's waist and knee.

U.S. Pat. No. 2,075,779, by J. Johnson et. al., for a "Corn Knife" attached to the waist, leg and foot of the user.

U.S. Pat. No. 4,871,099, by E. M. Bogar Jr., "Fishing Rod Holder" for a three rod holder suitable for mounting to a boat.

SUMMARY OF THE INVENTION

The present invention comprises a fishing rod and reel holding apparatus that is primarily intended for attachment to the shin of a fisherman's leg. In accord with the present invention the fishing rod and reel holding apparatus is preferably attached to that area of the fisherman's leg, between the knee and ankle, known as the shin or calf. Thus when a fish takes the bait, the striking force of the fish striking the bait is transmitted through the line to the fishing rod and reel, through the holding apparatus, and to the fisherman's leg. Thus the transmitted striking force, alerts the fisherman that he has a fish on the line. The fisherman may then remove the rod and reel from the holder to set the hook or he/she may set the hook by movement of the leg such that the tip of the fishing rod is raised thereby tensioning the line and setting the hook.

It is an object of the present invention to improve response time to a force transmitted through a fishing rod and reel assembly, by a striking fish, by transmitting that force to the wide sensing surface of the fisherman's shin.

It is an object of the present invention to provide apparatus whereby two fishing poles can be fished simultaneously by a single fisherman while the fisherman's hands remain free.

It is an object of the present invention to allow a fisherman to stand while the rod and reel holders are attached to his legs, without varying the angle of the fishing rod.

It is an object of the present invention, to allow a handicapped person, with loss of, or restricted use of, one arm to fish with two fishing rod and reel assemblies.

Further improvements include the positioning of the fishing rod holder within an imaginary circle having its center at the fisherman's shoulder with the radius of the circle being the distance between the fisherman's shoulder and the reach of a sitting users extended arm, and hand.

It is an object of the present invention to transmit force to a fishing rod and reel assembly from a point below the center of gravity of a fisherman.

It is therefore an object of our invention, that by positioning the fishing rod grip within this imaginary circle, a fisherman can, without moving his center of gravity, reach the fishing rod with an extended arm.

Still further, the fishing rod and reel holder, in accord with the present invention positions the fishing rod grip above the users foot and on a line passing through the bottom of the foot and the users knee. Thus a fishing rod, positioned within our improved holder, can be jigged by the reciprocal motion of the users foot, moving up and down, upon the ball of the foot.

Also by positioning the fishing rod and reel holder, on the imaginary line between the bottom of the foot and the knee, an upward rotation of the fisherman's leg, about the hip joint, results in a large movement of the tip of the fishing rod thereby setting the hook upon a fish strike since raising the user's leg several inches, with the rod and reel in our improved holder, causes the rod tip to rise a much greater distance than the leg. Our improved fishing rod holder is not necessarily limited to use in a boat. The device can be used while ice fishing, sitting in a chair, on a bucket or on a bench. Jigging can be done with one or two rods mounted within holders, on one or two legs. The invention allows a user to use his hands for other tasks, or duties, such as steering the boat when trolling, while retaining the ability to feel fish on a line, to jig and/or to set a hook.

DESCRIPTION OF THE PREFERRED EMBODIMENT

Figures 1, 17:
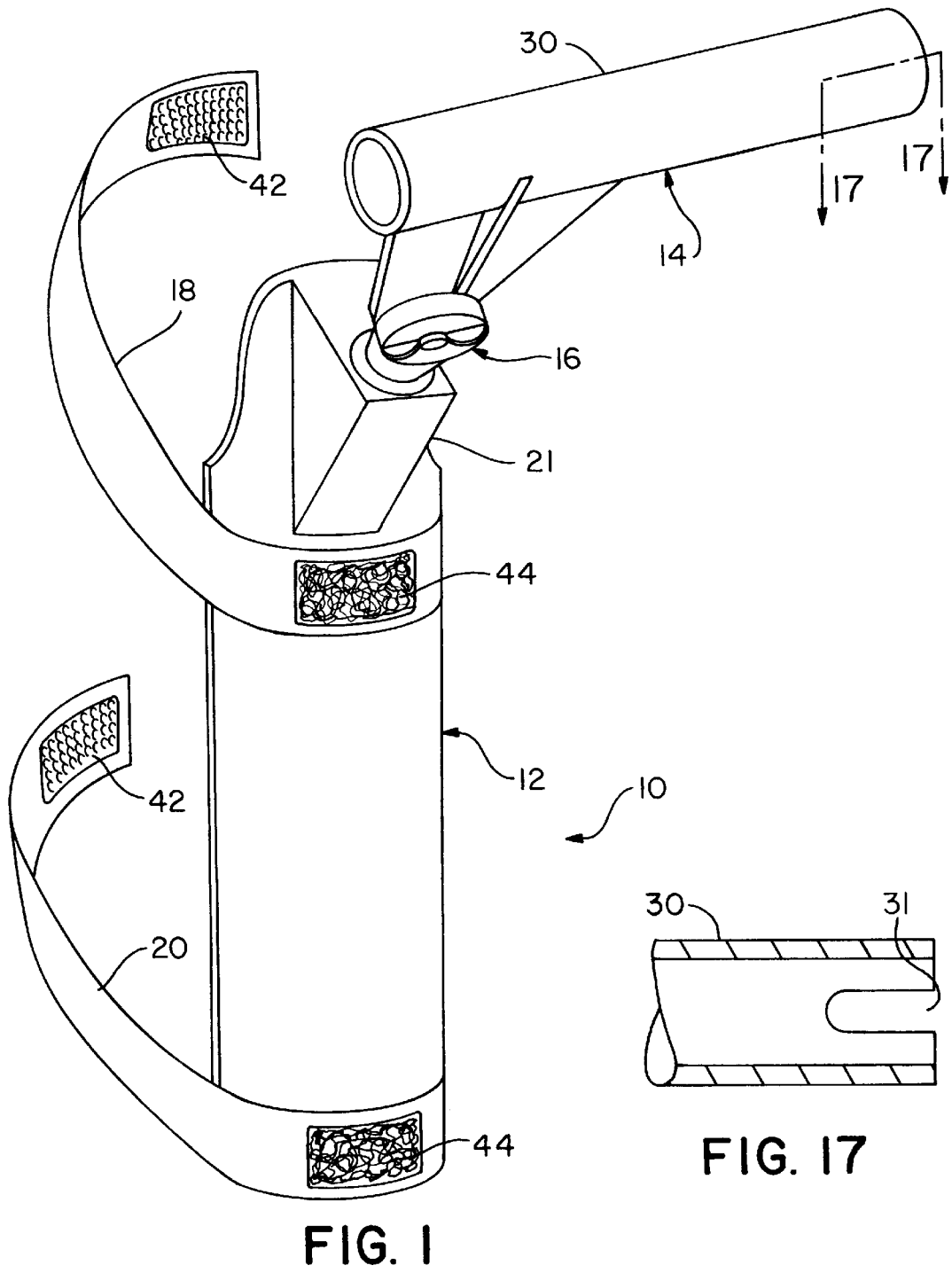
FIG. 1 is a pictorial view of my new and improved fishing rod holder.
FIG. 17 is a cross sectional view taken along line 17—17 in FIG. 1.

Referring to FIGS. 1 through 6 a fishing rod and reel holder 10, embodying the present invention, is illustrated comprising a base frame 12, a removable fishing rod and reel holding assembly 14 and a swivel mechanism 16. A pair of releasable, securing straps 18 and 20 are attached to the top and bottom, respectively, of base frame 12 as illustrated in FIG. 1.

Figure 2:
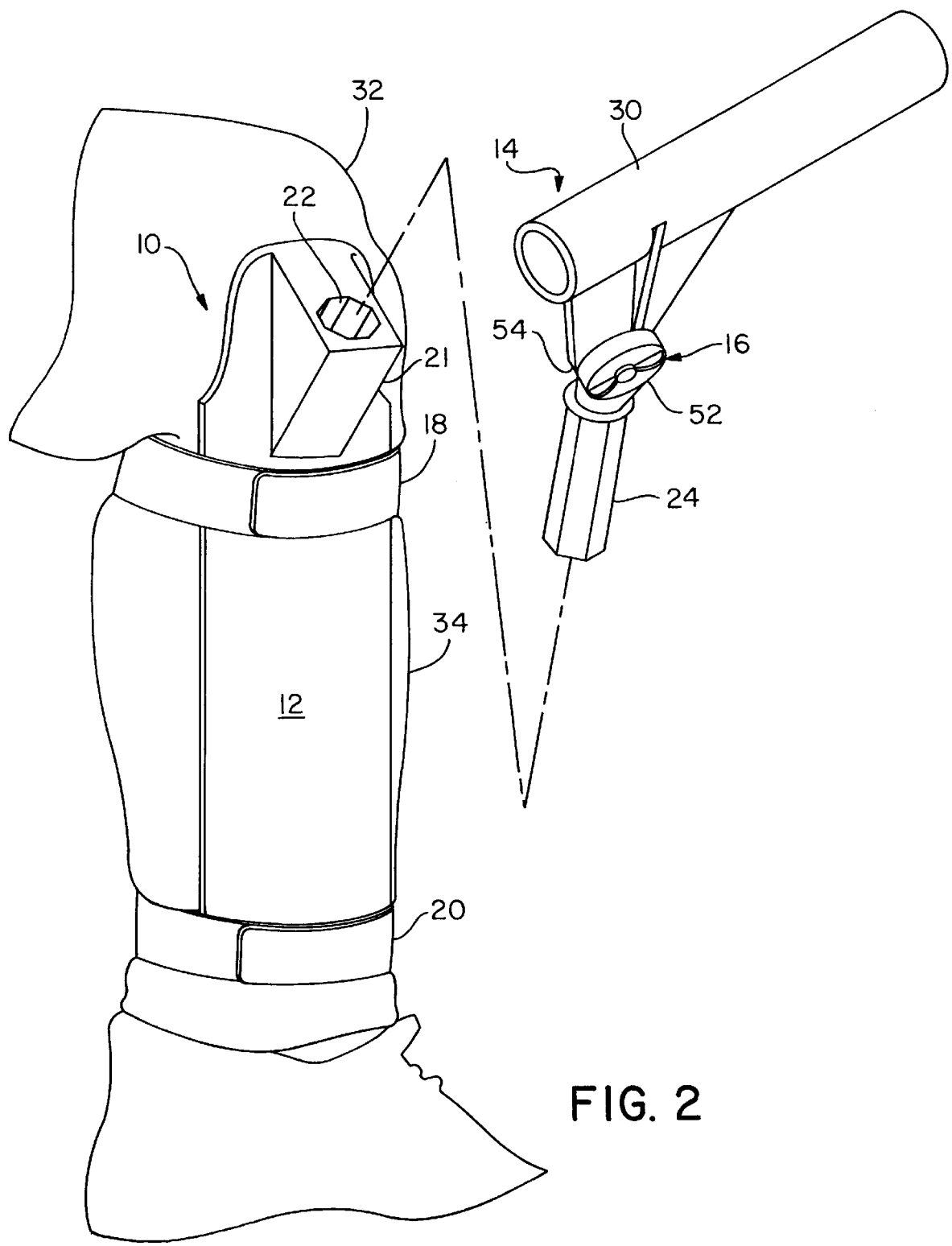
FIG. 2 is a pictorial view of my new and improved fishing rod holder attached to a fisherman's leg and showing the two major subassemblies of the assembled unit.
Figure 3:
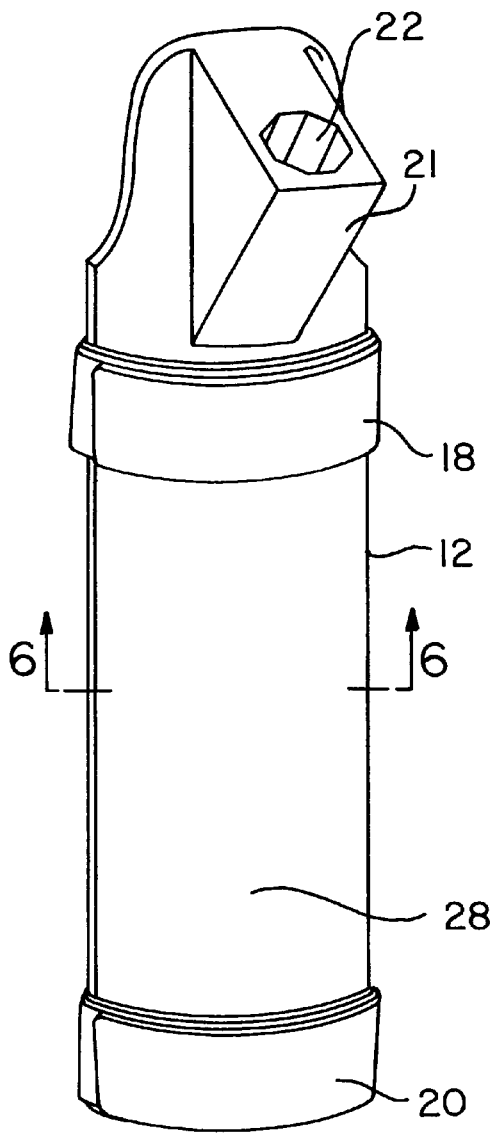
FIG. 3 is a pictorial view of the leg attachment base frame with the fishing rod holder subassembly removed.
Figure 4:
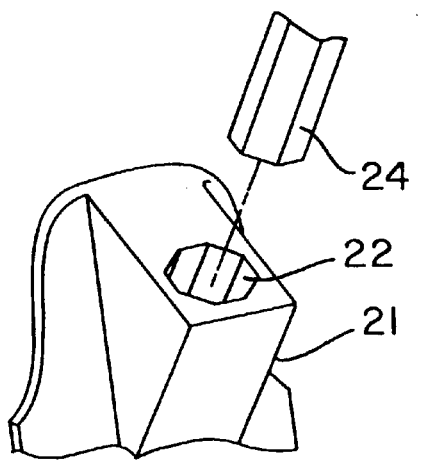
FIG. 4 is a partial pictorial view showing how the fishing rod holder assembly removable attaches to the leg attachment base frame.
Figure 5:
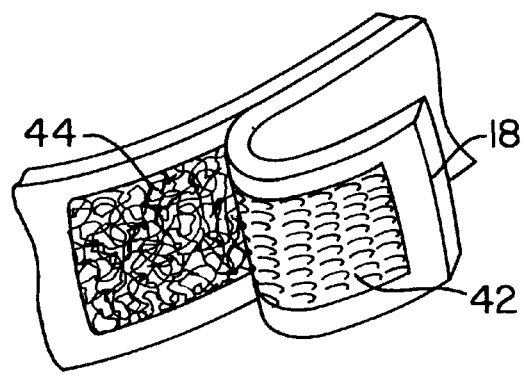
FIG. 5 is a partial pictorial view showing the J-hook and loop attachment of the leg strap.

Securing straps 18 and 20 are intended to extend about the shin portion of a fisherman's leg as best illustrated in FIG. 2. Any suitable means to secure straps 18 and 20 may be used such as buttons, snaps, buckles or, more preferably, a system of textile J-hooks 42 and loops 44 as illustrated in FIG. 5. Such a system of textile J-hooks and loops is well known, within the textile and garment industry, as Velcro® fasteners.

At the top of, and integral with, base frame 12 is a boss 21 including a pilot hole 22 having a polygonal cross section, preferably hexagonal, which receives therein a corresponding polygonal pin 24 extending from the swivel mechanism 16 of holder assembly 14. Polygonal pilot hole 22 and pin 24 enables the polygonal pin, to be adjusted to different angular directions away from the fisherman's shin. It is further preferable that the longitudinal axis of pilot hole 22 is slanted outward from the user's leg 34 by an angle of approximately ten to forty five degrees and the longitudinal axis of pin 24 is preferably coplanar with the longitudinal axis of rod retainer 30 such that when the rod holder assembly 14 is attached to base frame 12, by inserting polygonal pin 24 into pilot hole 22, the holder assembly 14 is slanted outward and away from the fisherman's leg 34.

The axial length of base frame 12 should be slightly less than that of the shin 34 of a typical user, so as to not irritate the fisherman's leg, knee or ankle, by bearing upon either the knee or ankle.

Figure 6:
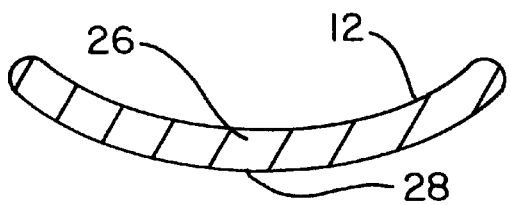
FIG. 6 is a cross sectional view of the leg attachment base frame as taken along line 6—6 of FIG. 3.

Referring additionally to FIG. 6, base frame 12 preferably comprises a concave inner surface 26 and an opposing convex outer surface 28. Concave surface 26 extends around a portion of the fisherman's leg, between the knee and ankle. Although in the preferred embodiment, of the present invention, base frame 12 is made of a rigid plastic or metal material having the above described inner and outer concave and convex surfaces, base frame 12 may alternatively be made of a non-rigid, flexible, material whereby base frame 12 will bendingly conform to the users leg as straps 18 and 20 are pulled snug about the user's leg and when straps 18 and 20 are released base frame 12 will spring open to its original shape.

Detachable rod and reel holder assembly 14 generally comprises a polygonal mounting pin 24, a fishing rod and reel retainer 30, and a swivel assembly 16. The length of pin 24, is preferably chosen to extend rod retainer 30, and its retained rod and reel, at the level of, or above the level of, the fisherman's knee 32 and angled away from the fisherman's leg 34. When in use, pin 24 is inserted in hexagonal pilot hole 22 with a rotational orientation, selected by the user, whereby the angle of rod retainer 30 (and the rod and reel, not shown) with respect to the fisherman's leg 34, is determined by the user selected position of pin 30 within pilot hole 22.

Figure 10:
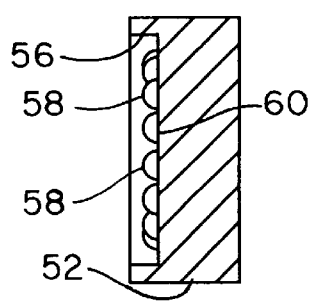
FIG. 10 is an cross sectional view taken along line 10—10 of FIG. 8.
Figure 11:
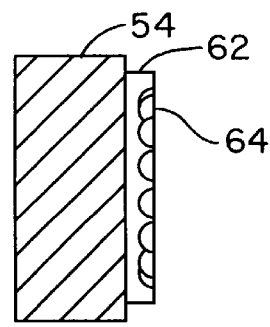
FIG. 11 is a cross sectional view taken along line 11—11 of FIG. 9.

The rod and reel retainer 30 is pivotally connected to pin 24 by swivel hinge assembly 16. As illustrated in FIG. 7 through 11, swivel assembly 16 generally comprises a pair of opposed hinge members 52 and 54 attached to pin 24 and retainer 30 respectively. Hinge member 52 includes a circular recess 56 having a circular array of equally spaced protrusions 58 extending upward from bottom surface 60 as illustrated in FIG. 10. Hinge member 54 includes a circular boss 62 having a circular array of equally spaced indentations 64 therein as illustrated in FIG. 11. The circular boss 62 of hinge member 54 is rotatingly received within the circular recess 56 of hinge member 52 such that the protrusions 58 of member 52 are in matched relation to the indentations 64 of member 62 whereby the protrusions 58 of member 52 may lockingly engage the indentations 64 of member 54.

Thus by slightly separating hinge members 52 and 54, thereby disengaging protrusions 58 from indentations 64, and selectively rotating hinge member 54 (and its attached rod and reel retainer 30) relative to hinge member 52 (attached to pin 24) the user may select the desired angle between the centerline of retainer 30 and the center line of pin 24. As can be readily appreciated, by viewing FIG. 7 through 11, hinge members 52 and 54 may be locked in a selected rotational relationship, one to the other, by the engagement of protrusions 58 with indentations 64.

Figure 7:
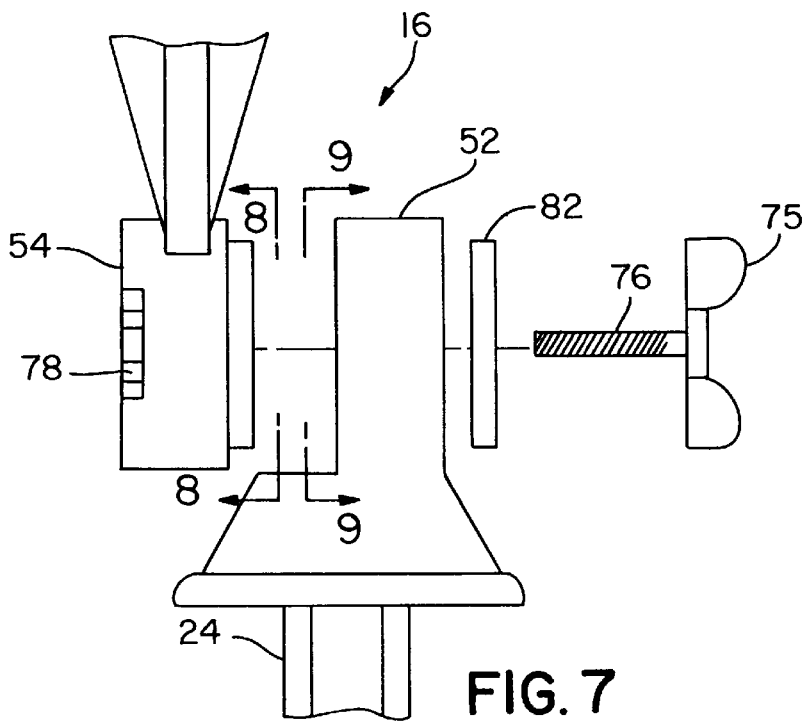
FIG. 7 is an exploded, elevational view of the swivel mechanism adjustable hinge.
Figure 8:
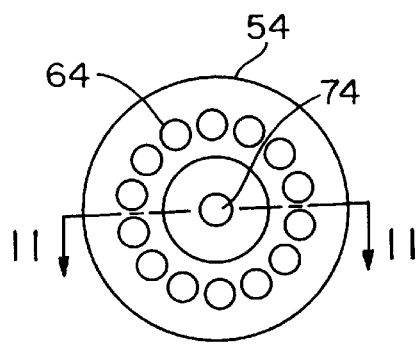
FIG. 8 presents an elevational view taken along line 8—8 of FIG. 7.
Figure 9:
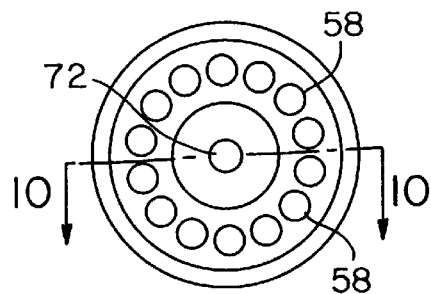
FIG. 9 presents an elevational view taken along line 9—9 of FIG. 7.

Hinge members 52 and 54 are further provided with centrally aligned bores 72 and 74, respectively, for receipt of axle 76 therethrough, as illustrated in FIG. 7. Axle 76 is typically threaded at its end so as to threadingly engage threaded nut 78 non rotatingly attached to hinge member 54 whereby hinge members 52 and 54 may be locked together. A winged head 75 is typically affixed to threaded axle 76 for ease of rotation. Washer 82 is also typically provided to provide a suitable surface for engagement of winged head 75.

Thus rod and reel retainer 30 is pivotable with respect to pin 24 and base frame 12. The desired angle of the rod and reel, within the retainer 30, is typically determined by the height of the boat gunwales. The tip of the fishing rod must be high enough so that the line extending therefrom, extends over the gunwales of the boat. Thus the tip of the rod, that is the rod height, is determined by what the particular fisherman likes. Some fisherman like a low tip, while some like a high tip.

The outside diameter of the rod and reel retainer 30 is approximately one and one-quarter inches, with an internal diameter slightly smaller. The inside diameter is sized to allow the grip of the fishing rod to extend into the retainer. A slot 31 is formed at the bottom of rod retainer 30 as shown in FIG. 17, to receive the supporting leg of the reel (not shown) thereby preventing the rod and reel from rotating inside the retainer, and locking the reel in a vertical position.

In constructing a prototype of our improved fishing rod retainer, PVC plastic pipe was used to form the rod retainer 30. However, any injection molded or impact molded plastic material would be suitable to form the retainer 30 and the base frame 12. Pin 24 was made of steel, first having a square cross section, however, a hexagonal cross section, as illustrated in the figures, is preferable. The prototype base frame 12, with its concave convex surfaces 26 and 28, was made of light, flexible, galvanized metal. However, for mass production the base frame 12 would, more preferably, be made of PVC or any other formable and resilient plastic material. The base frame of our prototype was twelve inches long, three inches wide, and twenty-one thousandths of an inch thick and formed as a concave-convex sheet, with the concavity placed against the fisherman's shin. Two attachment straps 18 and 20, of one and three quarters inch wide, were fastened, by rivet type fasteners, to the concave convex base frame 12 as shown in the figures. One strap was mounted at the top of the frame while the other was mounted at the bottom. A boss 21, having the requisite polygonal pilot hole 22 was attached to the top of base frame 12 with rivet fasteners. In the preferred embodiment, the straps have VELCRO® J-hook and loop fastening pads at each end.

Figure 12:
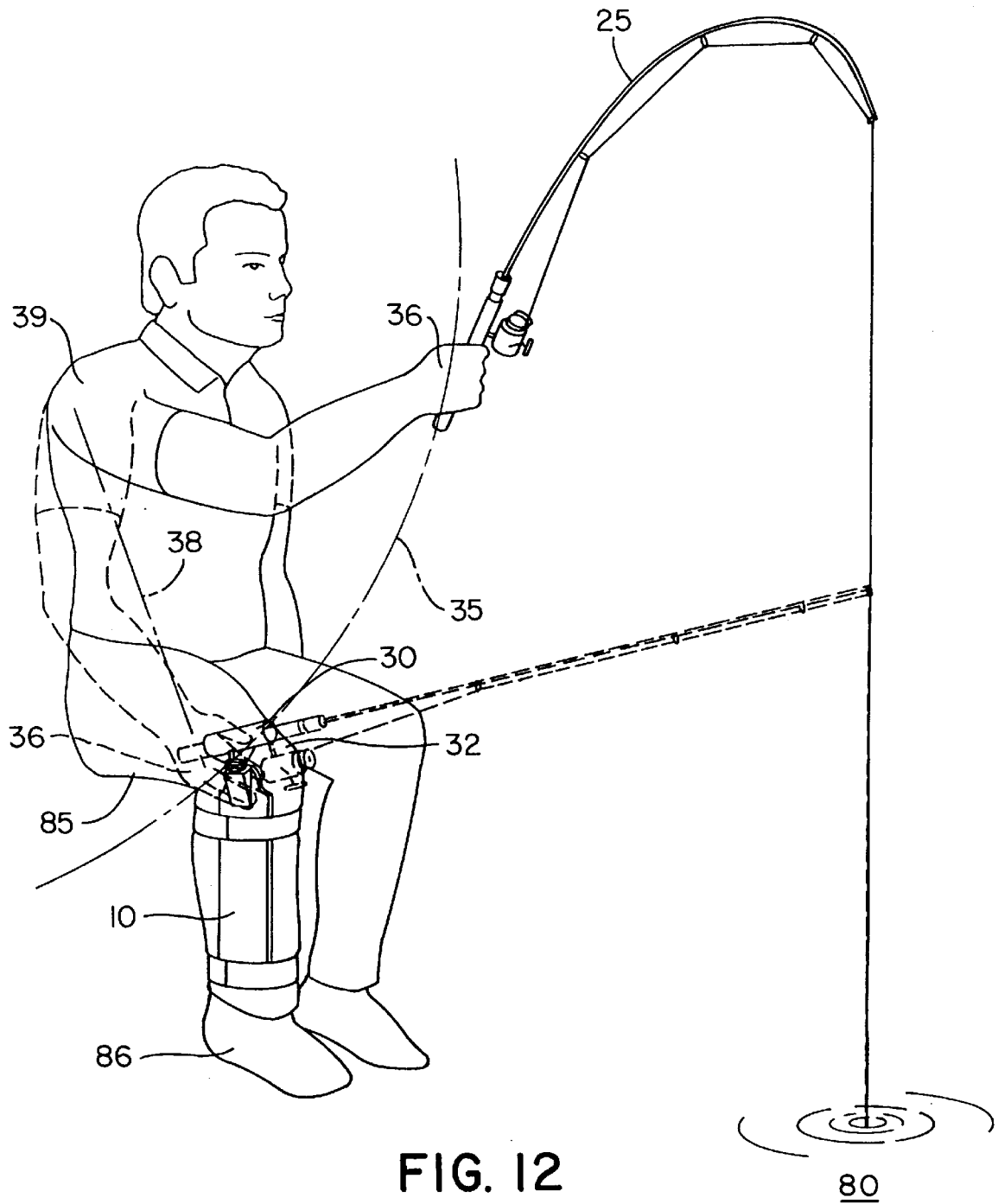
FIG. 12 presents a pictorial view of a seated fisherman showing the relationship between our improved fishing rod holder and the fisherman's shoulder and hand.

Now referring to FIG. 12, when rod and reel holder assembly 10 is attached to the fisherman's leg or shin 34, the rod and reel retainer 30, should be within easy reach of the fisherman's hand 36. That "reach" is defined as the straight line length 38 from the fisherman's shoulder 39 to his hand 36 when seated. The reach dimension 38 is important so as to limit movement of the fisherman's center of gravity, when reaching for the fishing rod while seated in a boat.

Preferably the locus of the fisherman's hand 36, when fully extended, about his shoulder 39 passes through an imaginary circle 35, having its center at the fisherman's shoulder 39, with the perimeter of the circle passing through the hand 36 of the fisherman, and through the fishing rod retainer 30 when attached to the fisherman's leg in the seated position as illustrated in FIG. 12.

With the center of the imaginary circle 35 at the fisherman's shoulder 39 and the movement of the fisherman's hand 36, along the imaginary circle 35, to the fishing rod retainer 30, minimizes the displacement of the fisherman's center of gravity when reaching for the fishing rod, thereby, limiting the rocking action of a boat.

Figure 13:
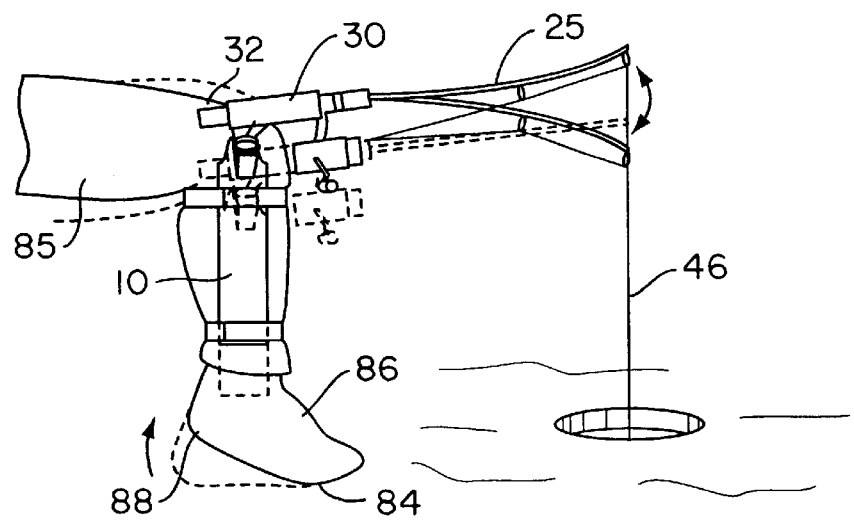
FIG. 13 presents a pictorial view of how a seated fisherman may "jig" a fishing line using the present invention.

Referring now to FIG. 13, in one method of use commonly referred to as "jigging", the fishing rod and reel assembly 25, is mounted in the retainer 30, so as to reciprocate along an imaginary line, passing through the bottom of the boat, or water surface 80 as shown in FIG. 13, through the ball 84 of the fisherman's foot 86, and through his knee 32. By movement of the fisherman's heel 88 up and down about the ball 84 of his foot, as shown in FIG. 13, the fishing rod assembly 25 also is caused to move up and down. Thus a "jigging" action is transmitted from the fisherman's leg to the fishing line 46, causing movement of the bait up and down.

Figure 14:
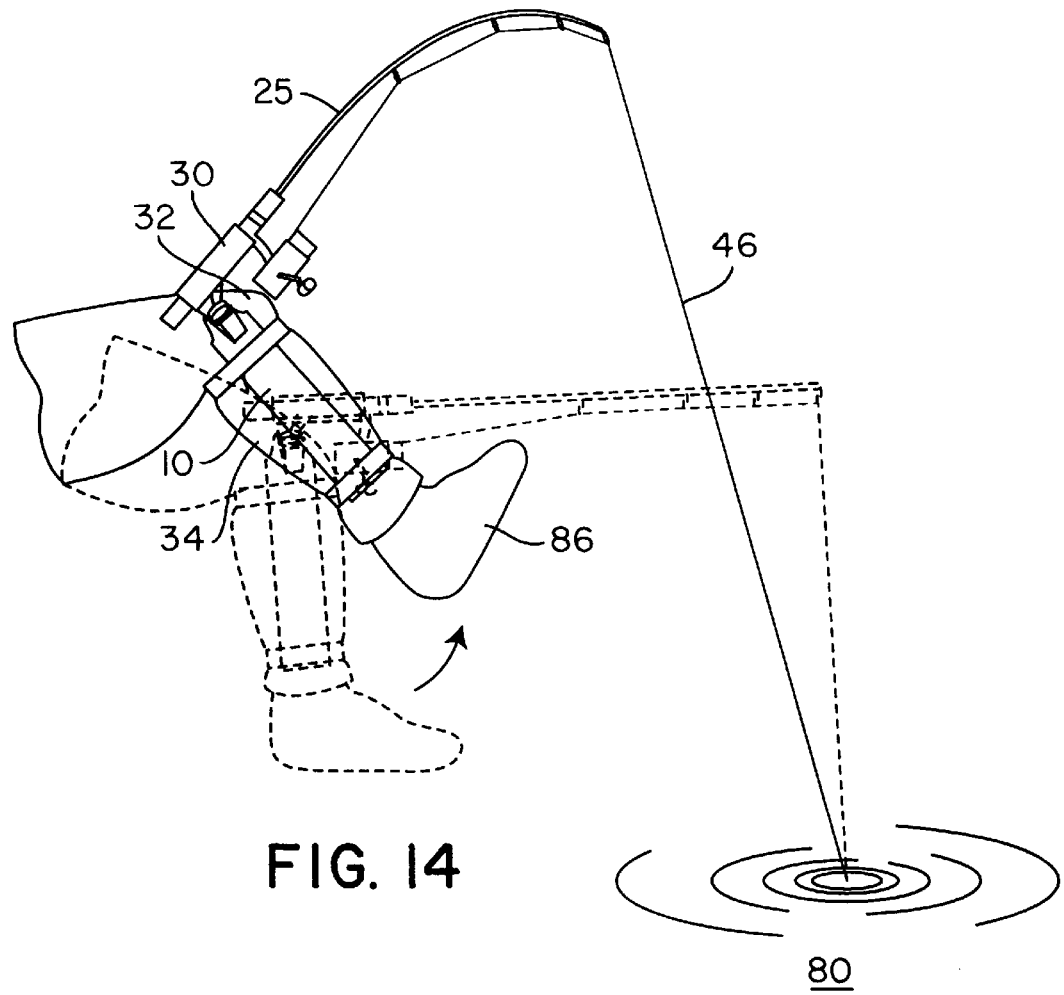
FIG. 14 shows a pictorial view of how a seated fisherman may set the hook into a striking fish by movement of his leg.

Referring now to FIG. 14, upon sensing that a fish has taken the bait the fisherman may set the hook, hands-off, by rotatingly raising his leg 34 about the knee 32 whereby the tip of the fishing rod 25 assembly is caused to raise thereby applying a vertical force to line 46 to set the hook.

Figure 15:
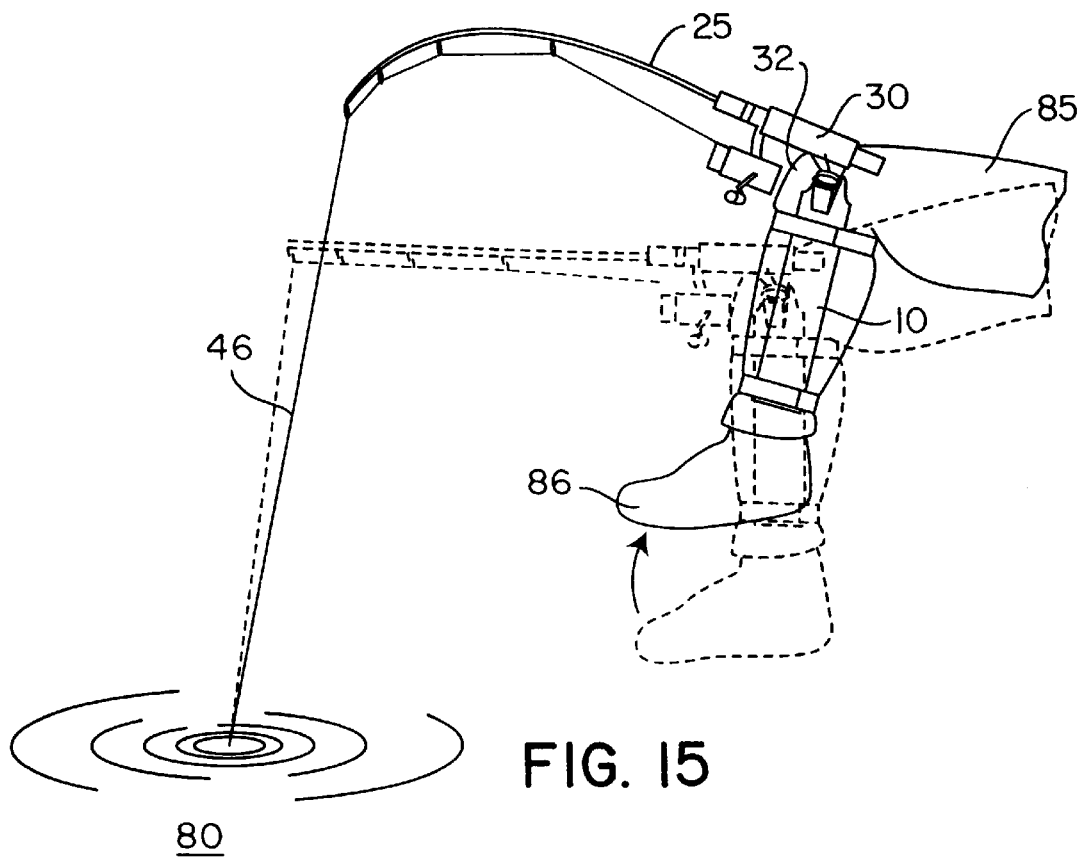
FIG. 15 presents a pictorial view of how a seated fisherman may set the hook into a striking fish by raising his thigh.

Similarly, as shown in FIG. 15, upon sensing that a fish has taken the bait the fisherman may raise his knee 32 by rotating his thigh 85 about the hip (not shown) whereby the fishing rod assembly 25 is again caused to rise thereby applying a vertical force to line 46 and setting the hook.

Figure 16:
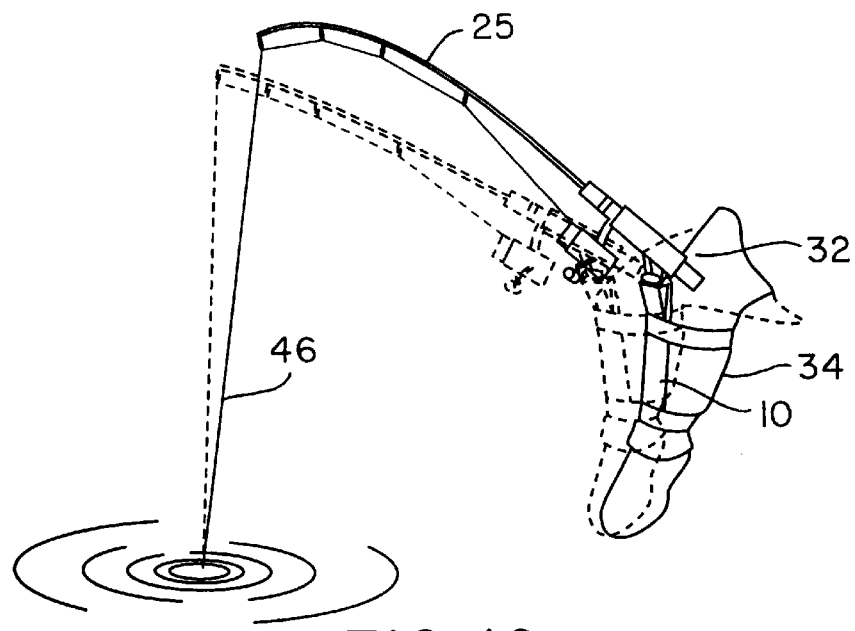
FIG. 16 presents a pictorial view of how a seated fisherman may set the hook into a striking fish by movement of his knee.

Also, as illustrated in FIG. 16, by movement of the fisherman's knee 32 from side to side, a vertical force may again be applied to the line 46 thereby setting the hook when a fish strike is sensed.

While our invention has been described in a specific embodiment thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims literally or by the doctrine of equivalence.

We claim:

1. A fishing rod holder for securing a fishing rod with a line and a hook to a leg of an individual, the leg having a foot and a shin with a thicker calf portion, the fishing rod comprising:

an elongated base frame adapted for alignment with the shin of the individual;

securing means for securing said base frame to the leg of the individual, said leg securing means engaging the leg at multiple, spaced apart points of securement, one of said points of securement being below the calf of the individual, said securing means maintaining said base frame in said alignment with the shin during use; and, a holder assembly extending from said base frame, the fishing rod being mounted to said holder assembly at a fixed angle relative to the shin of the individual, wherein the individual can jig the fishing rod and set the hook by movement of their shin.

2. The fishing rod holder of claim 1, and wherein the securing means engages the leg above and below the calf of the individual.

3. The fishing rod holder of claim 2, and wherein said base frame is aligned substantially parallel to the shin of the individual.

4. The fishing rod holder of claim 3, and wherein said base frame includes an inside surface, and said inside surface is adapted to engage the leg of the individual.

5. The fishing rod holder of claim 4, and wherein said securing means includes a lower strap fastened proximal said bottom of said base frame and is adapted to engage the shin of the individual below said calf.

6. The fishing rod holder of claim 5, and wherein said securing means includes an upper strap fastened proximal said top of said base frame and is adapted to engage the shin of the individual above said calf.

7. The fishing rod holder of claim 6, and wherein the leg of the individual further includes an ankle and a knee, and wherein said base frame is adapted to engage the shin of the individual, and said lower strap is adapted to secure around the shin above the ankle, and said upper strap is adapted to secure around the shin below the knee.

8. The fishing rod holder of claim 7, and wherein said base frame is flexible and is adapted to conform to the leg of the individual when said straps are pulled snug to secure said base frame to the shin of the individual.

9. The fishing rod holder of claim 8, and wherein said inner surface is concave.

10. The fishing rod holder of claim 1, and wherein said base frame includes an outside surface, and said holding assembly extends from said outside surface and is slanted outwardly and away from the leg of the individual.

11. The fishing rod holder of claim 10, and wherein said holding assembly is removable from said base frame.

12. The fishing rod holder of claim 11, and wherein said base frame includes a boss with a pilot hole having a predetermined polygonal cross-sectional shape, and said holder assembly includes a pin having a corresponding polygonal cross-sectional shape, said pin and hole permit selective adjustment of said pin and said holder assembly at different angular directions relative to the shin of the individual.

13. The fishing rod holder of claim 12, and wherein said pin has a longitudinal axis, and said holding assembly includes a swivel mechanism and a rod retainer, said swivel mechanism enabling selective rotation of said rod retainer relative to said longitudinal axis of said pin.

14. The fishing rod holder of claim 13, and wherein said rod retainer has an opening for receiving the fishing rod, and said rod retainer has a slot for preventing the fishing rod from rotating in said opening.

15. The fishing rod holder of claim 13, and wherein said outside surface is convex.

16. The fishing rod holder of claim 1, and wherein the individual has a center of gravity, and the leg of the individual has a knee at a predetermined level when in a seated position, and said holder assembly is adapted to hold the fishing rod at said predetermined level to enable the individual to reach the rod when seated while maintaining their center of gravity.

17. The fishing rod holder of claim 1, and wherein the individual has a center of gravity, and the leg of the individual has knee at a predetermined level when in a seated position, and said holder assembly is adapted to hold the fishing rod above said predetermined level to enable the individual to reach the rod when seated while maintaining their center of gravity.

* * * * *